(12) United States Patent
Kim et al.

(10) Patent No.: US 6,222,984 B1
(45) Date of Patent: Apr. 24, 2001

(54) METHOD AND APPARATUS FOR INTERACTIVELY CHECKING AN ERROR IN A VIDEO CASSETTE TAPE RECORDER

(75) Inventors: Chang-Jin Kim, Incheon; Byoung-Chul Jeong, Kyeongki-Do, both of (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/058,214

(22) Filed: Apr. 10, 1998

(51) Int. Cl.[7] .............................. H04N 5/76; H04N 5/782
(52) U.S. Cl. ........................... 386/113; 386/46; 360/69
(58) Field of Search .............................. 386/113, 95, 46, 386/80, 83, 81, 1, 6, 52, 21; 360/69, 75, 71, 137, 32; H04N 5/76, 5/782

(56) References Cited

U.S. PATENT DOCUMENTS

| | | | |
|---|---|---|---|
| 5,053,906 | * 10/1991 | Rayis | 360/137 |
| 5,469,308 | * 11/1995 | Hamoda et al. | 360/71 |
| 5,483,391 | * 1/1996 | Gweon et al. | 360/69 |
| 5,506,892 | 4/1996 | Kojima et al. | 379/102 |
| 5,604,647 | 2/1997 | Jo | 360/69 |

* cited by examiner

Primary Examiner—Robert Chevalier
(74) Attorney, Agent, or Firm—Pillsbury Winthrop LLP

(57) ABSTRACT

Method and apparatus for interactively checking an error of a video cassette tape recorder. Whether or not a service mode is selected by a first remote controller input is checked. A menu picture is displayed on a television screen if the service mode is selected. Whether or not an error check mode in the menu picture is selected by a second remote controller input is checked, and then an error check mode picture is displayed on the television screen if the error check mode is selected. A first check operation is performed about a reproducing system and a first check result is stored into a memory, and an insertion request picture which requests an insertion of a test video cassette is displayed on the television screen when the first check operation is finished. A second check operation is performed about the reproducing system while a reproducing is going on after the test video cassette is inserted and a second check result is stored into the memory. Each operation mode is sequentially performed after the second check operation is finished, and then a third check operation is performed about the reproducing system and then a third result is stored into the memory. The first, second and third check results stored in the memory are displayed on the television screen after the third check operation is finished.

17 Claims, 8 Drawing Sheets

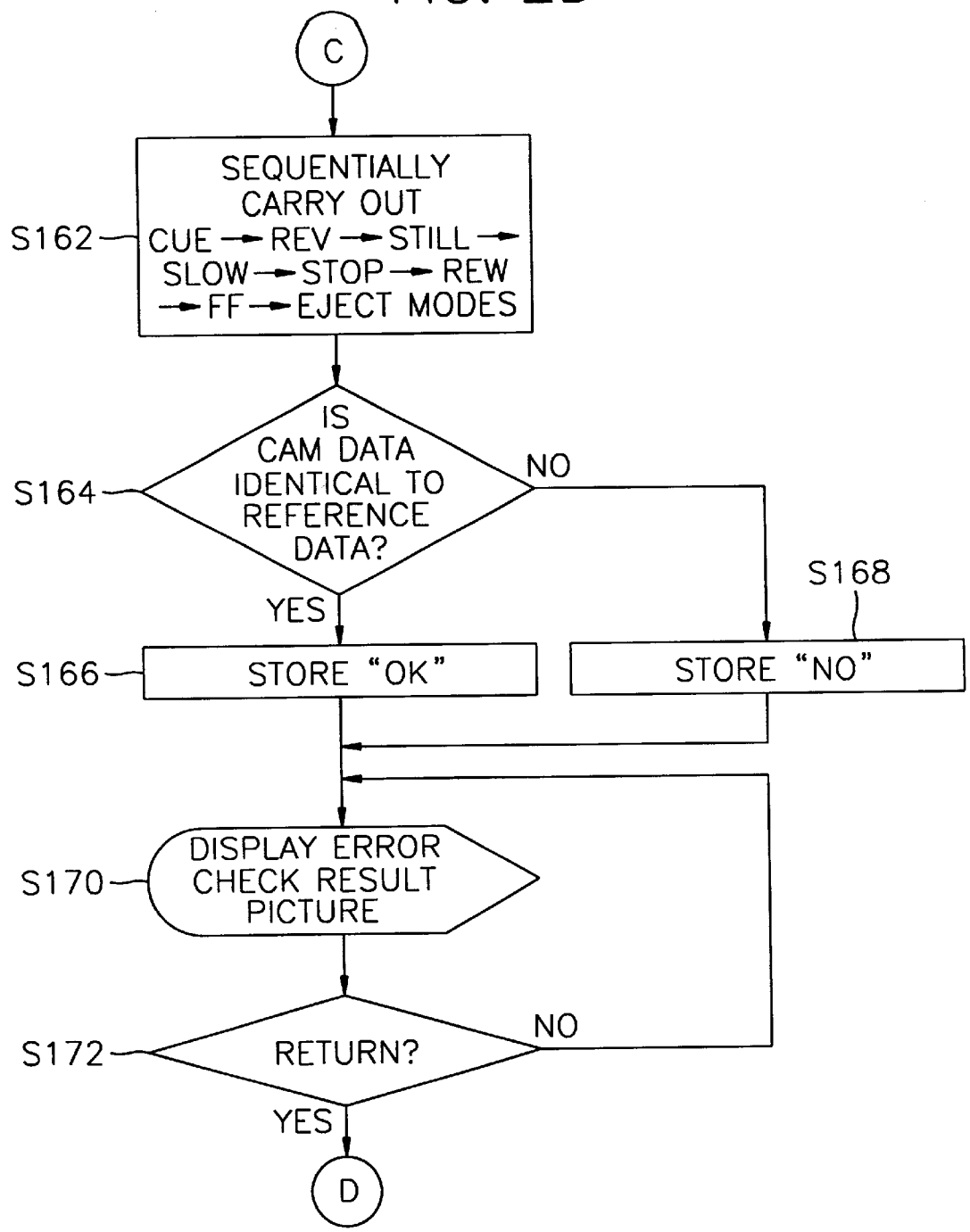

METHOD AND APPARATUS FOR INTERACTIVELY CHECKING AN ERROR IN A VIDEO CASSETTE TAPE RECORDER

BACKGROUND OF THE INVENTION

1. Field of the Invention

The present invention relates to a service mode of a video cassette tape recorder, and more particularly to a method and apparatus for interactively checking an error of a system following instruction pictures on a television screen by using a remote controller during a test or a repair thereof.

2. Description of the Prior Art

A video cassette tape recorder is designed and manufactured with a spec adequate to a received television broadcasting type. Accordingly, manufacturers of the video cassette tape recorder adopt a scheme for improving a productivity by an unification and a standardization of components thereof in order to produce various products adequate to various broadcasting types in one processing line.

Therefore, the manufacturers must consider early on in a development stage that several similar broadcasting type sets can be manufactured by one processing line by adding options to a conventional broadcasting type set. So, researchers have invested a relatively long amount of time and effort in developing test products corresponding to various options and in testing the same.

In the development of the products, the testing thereof or an after service, a technique for systematizing an error check of the sets to improve the workability has been required.

U.S. Pat. No. 5,604,647 discloses a technique for systematizing the error check of the sets. The error check systematizing technique is adopted to products so as to be efficiently utilized in the after service.

U.S. Pat. No. 5,506,892 discloses a technique capable of checking and adjusting the video cassette tape recorder from a remote location by using a telephone line.

However, so far, there is no way to easily check an error of a set without any special testing instruments and to display the check result thereof in detail.

SUMMARY OF THE INVENTION

The present invention is intended to overcome the above described disadvantages. Therefore, it is an object of the present invention to provide a method and an apparatus for interactively checking an error of a video cassette tape recorder without any special instruments.

In order to achieve the object of the present invention, there is provided a method for interactively checking an error of a video cassette tape recorder, which comprises: checking whether a service mode is selected by a first remote controller input; displaying a menu picture on a television screen if the service mode is selected; checking whether an error check mode in the menu picture is selected by a second remote controller input; displaying an error check mode picture on the television screen if the error check mode is selected, carrying out a first check operation about a reproducing system and storing a first check result into a memory; displaying an insertion request picture which requests an insertion of a test video cassette on the television screen when the first check operation is finished; carrying out a second check operation about the reproducing system while a reproduction operation is going on after the test video cassette is inserted and storing a second check result into the memory; carrying out each operation mode sequentially after the second check operation is finished, carrying out a third check operation about the reproducing system and storing a third result into the memory; and displaying the first, second and third check results stored in the memory on the television screen after the third check operation is finished.

Also, the apparatus for interactively checking an error of a video cassette tape recorder has an input means for inputting a remote controller signal; on-screen generating means for outputting an on-screen picture signal onto a television screen by inputting an on-screen data; a deck section for generating a capstan motor frequency pulse, a drum motor frequency pulse, a takeup reel pulse, a supply reel pulse and a cam data; a video processing section for generating a control pulse and a DC-envelop signal reproduced from a test video tape; and a control section for checking whether a service mode is selected by a remote control signal by the input means, displaying a menu picture on the television screen by the on-screen generating means if the service mode is selected, checking whether an error check mode in the menu picture is selected, displaying an error check mode picture on the television screen if the error check mode is selected, carrying out a first check operation about the deck section, storing a first check result into a memory, displaying an insertion request picture which requests an inserting of a test video cassette on the television screen, carrying out a second check operation about the deck section and the video processing section while a reproduction operation is going on after the test video cassette is inserted, storing a second check result into the memory, carrying out each operation mode sequentially, carrying out a third check operation about the deck section, storing a third result into the memory; and displaying the first, second and third check results stored in the memory on the television screen.

BRIEF DESCRIPTION OF THE DRAWINGS

The above object and other advantages of the present invention will become more apparent by describing in detail a preferred embodiment thereof with reference to the attached drawings in which:

FIGS. 2A to 2D is a flowchart illustrating a method for interactively checking an error according to a preferred embodiment of the present invention.

DETAILED DESCRIPTION OF THE INVENTION

Hereinafter, a method and an apparatus for interactively checking an error of a video cassette tape recorder according to a preferred embodiment of the present invention will be explained in more detail with reference to the accompanying drawings.

Figure 1:
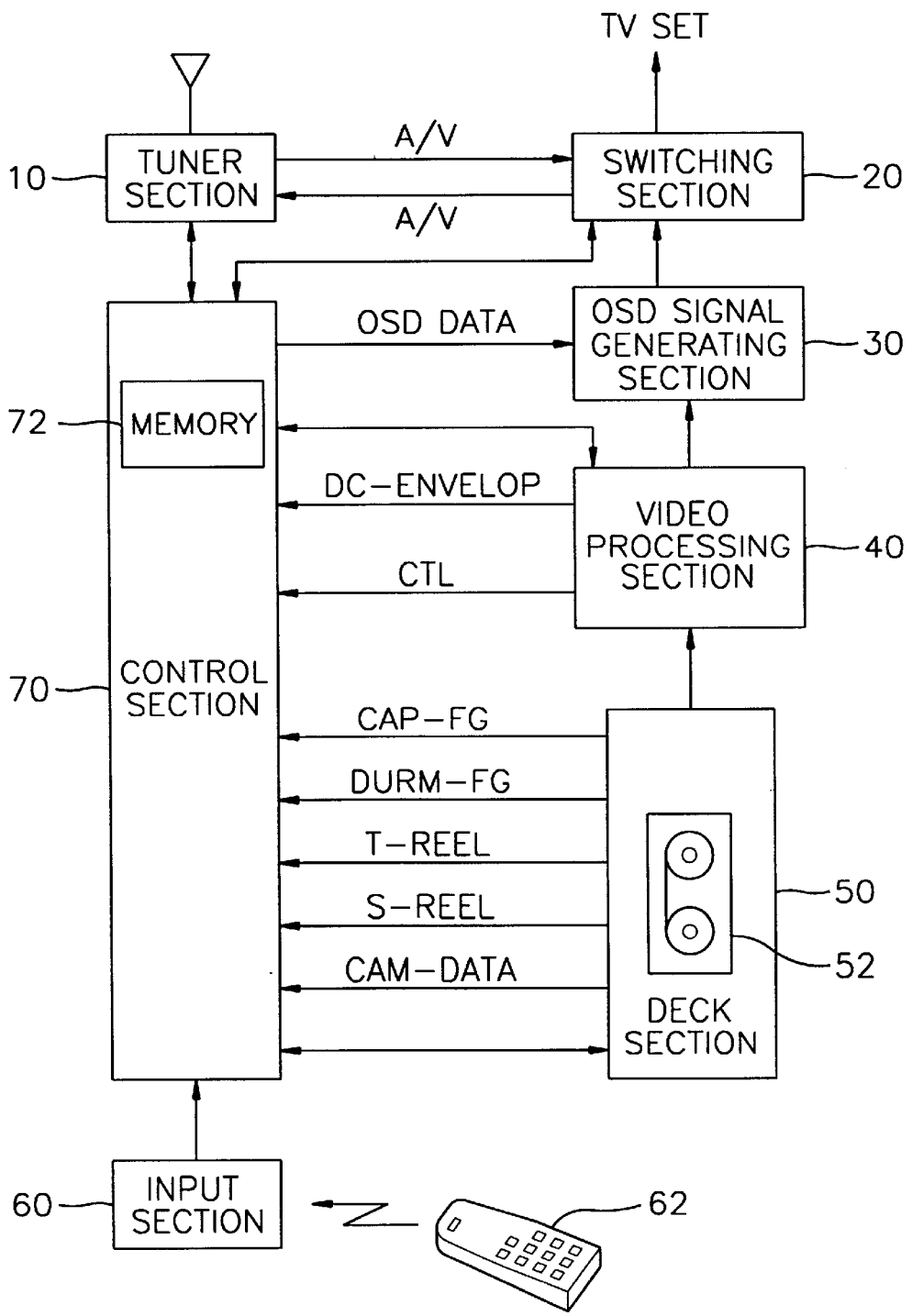
FIG. 1 is a block diagram illustrating a structure of a video cassette tape recorder according to the present invention.

FIG. 1 is a block diagram illustrating a structure of a video cassette tape recorder according to the present invention. As shown in FIG. 1, a video cassette tape recorder includes a tuner section 10, a switching section 20, an on-screen-display (OSD) signal generating section 30, a video processing section 40, a deck section 50, an input section 60 and a control section 70.

Tuner section 10 tunes a broadcasting signal of a channel selected among television broadcasting signals received by an antenna, demodulate a tuned signal and outputs video and audio signals. Also, tuner section 10 modulates inputted video and audio signals into a broadcasting signal of a specific channel so as to output a high frequency signal. The high frequency signal is provided as an antenna input of a television set.

Switching section 20 switches the input/output of the video and audio signals according to an operation mode. A line-output of switching section 20 is line-inputted into the television set.

On-screen-display signal generating section 30 transforms an inputted on-screen-display data into an RGB signal, transforms the RGB signal into a video signal and overlaps the video signal on a composite video signal so as to output the same.

Video processing section 40 detects a DC-envelop of a signal reproduced from a video cassette tape by a video reproducing head so as to output a DC-envelop signal and outputs a control pulse (CTL) reproduced from the tape by a control head. Also, video processing section 40 separates the reproduced video signal into a luminance and a color signal and signal-processes the same so as to output a composite video signal.

Deck section 50 generates a frequency pulse (CAP-FG) generated while a capstan motor is being actuated, a frequency pulse (DRUM-FG) generated while a drum motor is being actuated, a takeup reel pulse (T-REEL) generated while a takeup reel of the video cassette tape recorder is being rotated, a supply reel pulse (S-REEL) generated while a supply reel is being rotated, and a cam data (CAM-DATA) generated in response to a switching operation of a program switch according to a cam operation, respectively. Deck section 50 actuates a video cassette tape 52 loaded therein according to a given operation mode.

Input section 60 receives an optical signal of a remote controller 62 so as to generate a key signal in response to a key pad of a front panel of the set.

Control section 70 is a microcomputer including a memory 82. Microcomputer executes an operational program stored in memory 82 so as to control the above described sections and executes an error check program.

FIGS. 2A to 2D is a flowchart illustrating a method for interactively checking an error according to a preferred embodiment of the present invention. Repairmen execute the error check mode in a state where the video cassette tape recorder is connected to the television set.

Figure 2A:
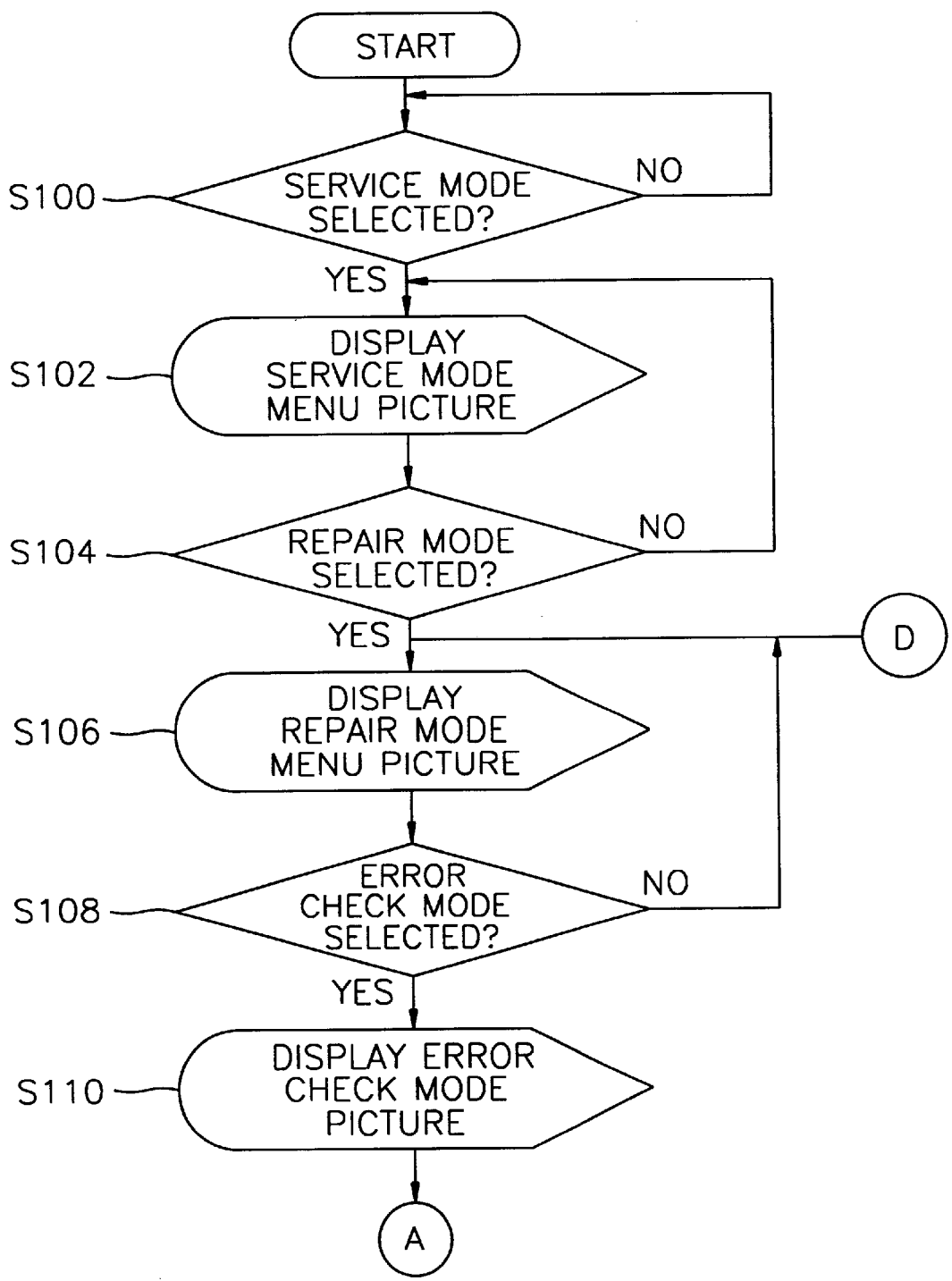
Figure 3:
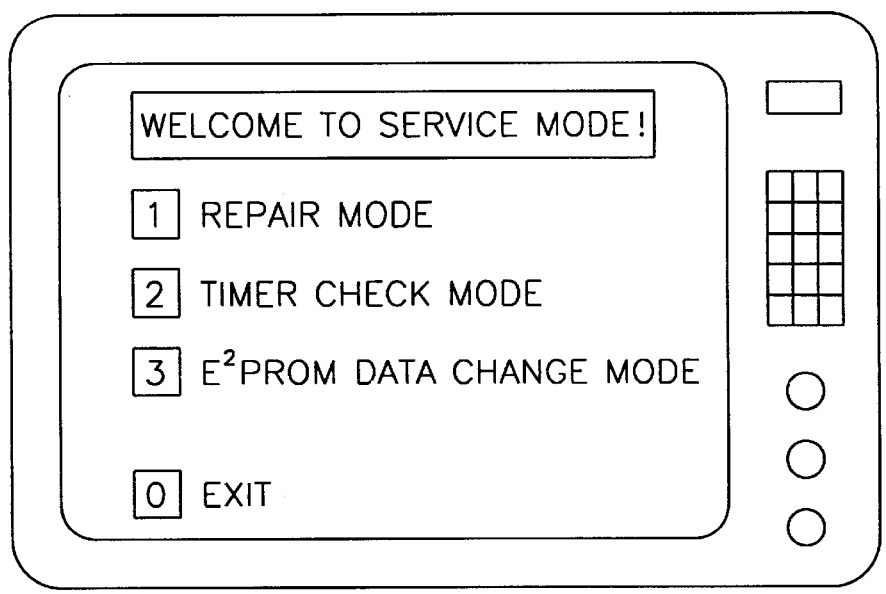
FIGS. 3 to 7 show error check pictures according to the present invention.

As shown in FIG. 2A, a service mode program according to the present invention is accessible only by a combination of password keys known only to specific workers such as a set developer, a test worker or a repairman. This prevents consumers from accessing the service mode. The worker pushes a menu key at first by remote controller 62 and sequentially pushes password keys such as number keys "4", "8" and "4". Input section 60 receives a key signal of remote controller 62 and transmits the same to control section 70. Control section 70 determines that a service mode is selected if the inputted key combination is a preset key combination (step S100) and transmits on-screen-display data to on-screen-display signal generating section 30 so as to generate a video signal. The generated video signal is transmitted to the television set through switching section 20 so that a service mode menu picture is displayed as an on-screen-display picture as shown in FIG. 3 (step S102). The service mode includes generally a repair mode, a timer check mode and an EEPROM data change mode.

Figure 4:
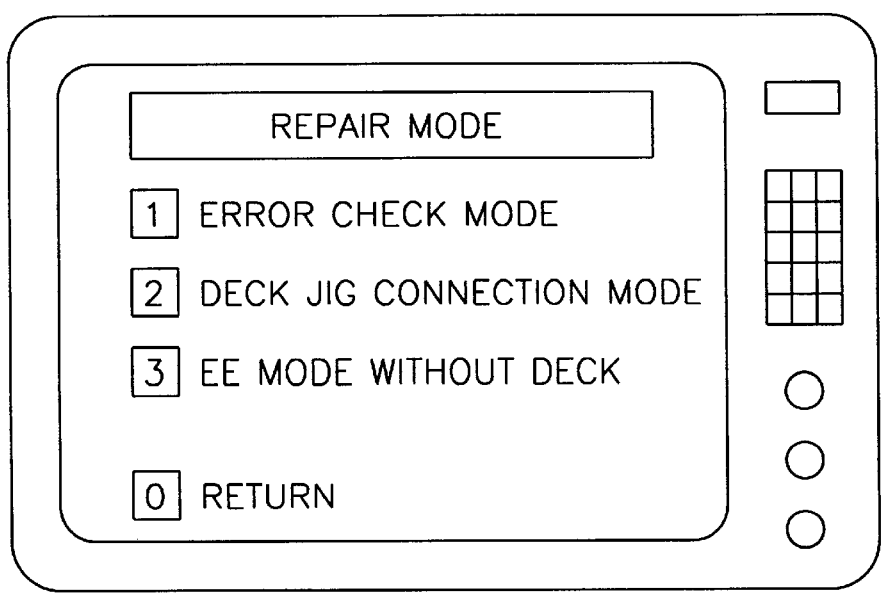

Thereafter, the worker pushes the number key "1" by remote controller 62, and then the key signal is transmitted to control section 70. Control section 70 determines that the repair mode is selected (step S104) and transmits an on-screen-display data to on-screen-display signal generating section 30. Accordingly, on-screen-display signal generating section 30 generates a video signal. The generated video signal is transmitted to the television set through switching section 20 so that a repair mode menu picture is displayed as an on-screen-display picture as shown in FIG. 4 (step S106). The repair mode includes an error check mode, a zig connecting mode and deck-free EE mode.

Figure 5:
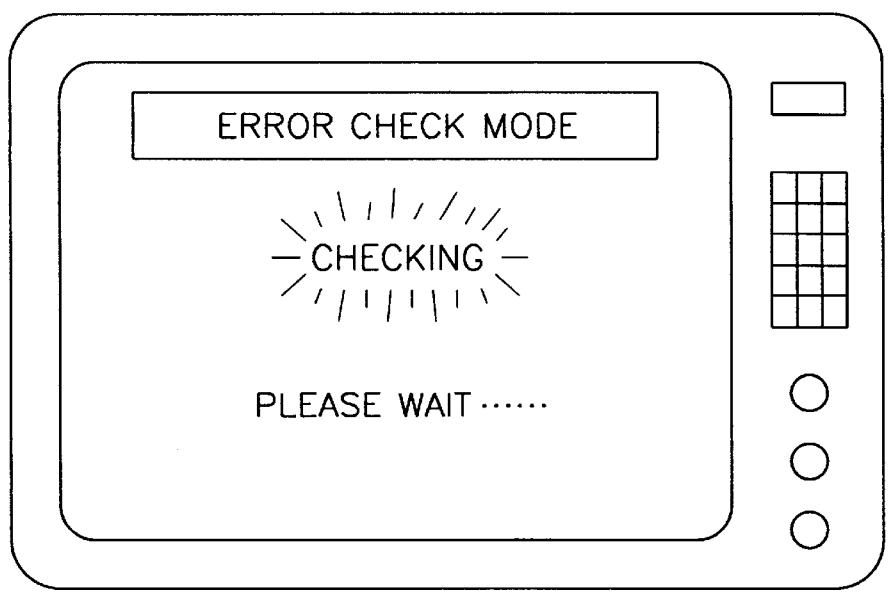

If, in order to select the error check mode as shown in the picture, the worker pushes the number key "1", through identical operations above described, control section 70 determines that the error check mode is selected (step S108) and transmits an on-screen-display data to on-screen-display signal generating section 30. Accordingly, on-screen-display signal generating section 30 generates a video signal. The generated video signal is transmitted to the television set through switching section 20 so that an error check mode picture is displayed as an on-screen-display picture as shown in FIG. 5 (step S110). The error check mode includes first, second and third check operations.

Figure 2B:
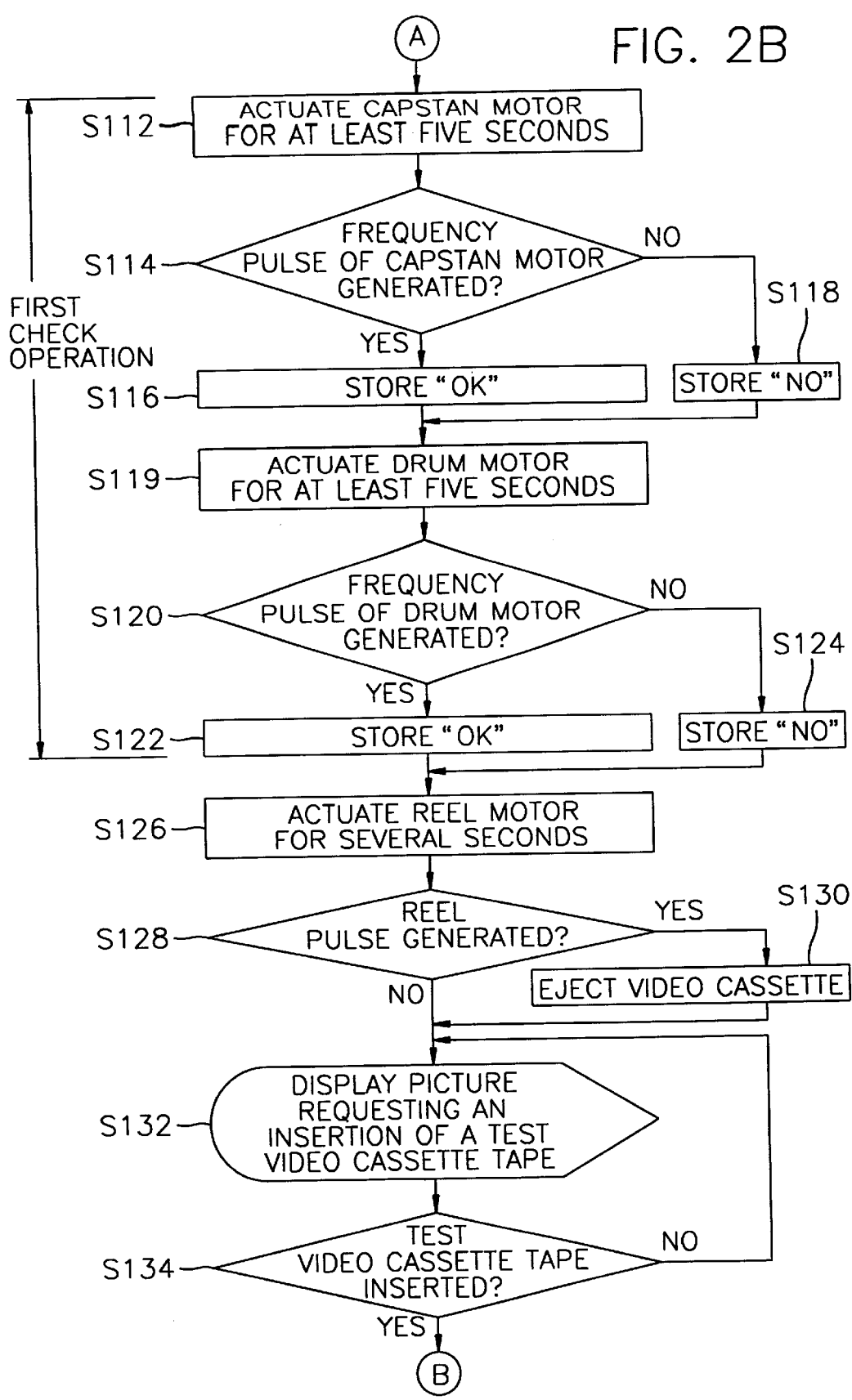

As shown in FIG. 2B, in the first check operation, control section 70 actuates the capstan motor in deck section 50 for a predetermined time, for example, at least five seconds (step S112) so as to check whether a frequency pulse of the capstan motor is generated (step S114). If there is a frequency pulse, control section 70 determines that there is no error in the capstan motor and stores an "OK" at a capstan motor check list in memory 72 (step S116). On the other hand, if there is no frequency pulse, control section 70 determines that the capstan motor does not rotate or that there is an error in a frequency pulse generator and stores a "NO" in memory 72 (step S118). Thereafter, control section 70 actuates the drum motor in deck section 50 for a predetermined time, for example at, least 5 seconds (step S119) so as to check whether a frequency pulse of the drum motor is generated (step S120). If there is a frequency pulse, control section 70 determines that there is no error in the drum motor and stores an "OK" at a drum motor check list in memory 72 (step S122). On the other hand, if there is no frequency pulse, control section 70 determines that the drum motor does not rotate or that there is an error in a frequency pulse generator and stores a "NO" in memory 72 (step S124).

As above described, in the first check operation, the capstan and drum motor systems of deck section 50 are checked. During the first check operation, "CHECKING" is turned on and off continuously on the screen in order to indicate that the check operation is being carried out.

Figure 6:
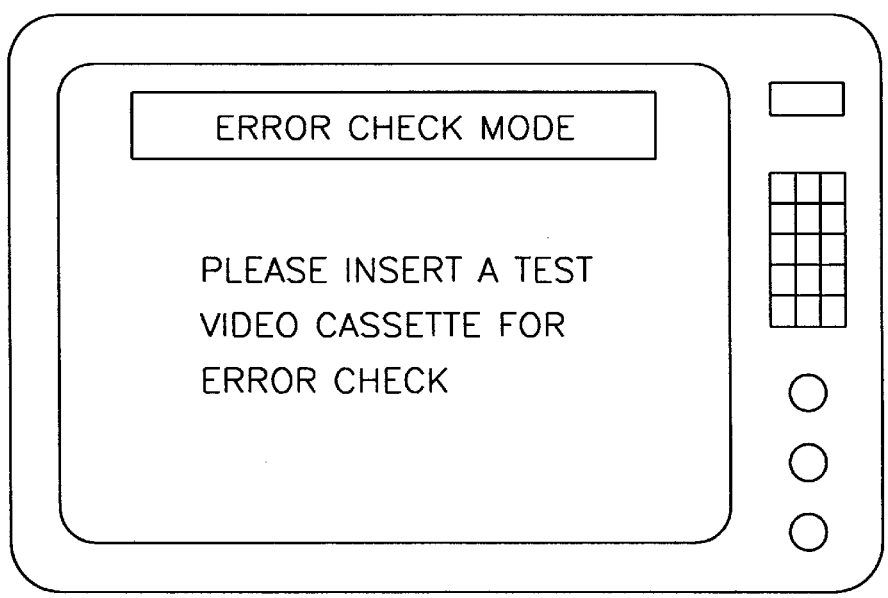

When the first check operation is finished, control section 70 actuates a reel motor in deck section 50 for several seconds (step S126) so as to check whether a reel pulse is generated (step S128). If the tape is loaded in deck section 50, and so the reel pulse is generated, then control section 70 ejects the tape (step S130). In step 128, if there is no tape loaded or if the tape is ejected in step 130, control section 70 displays a picture requesting an insertion of a test video cassette tape 52, as shown in FIG. 6. When the worker inserts test video cassette tape 52 into deck section 50, control section 70 checks whether the test tape is loaded (step S134).

Figure 2C:
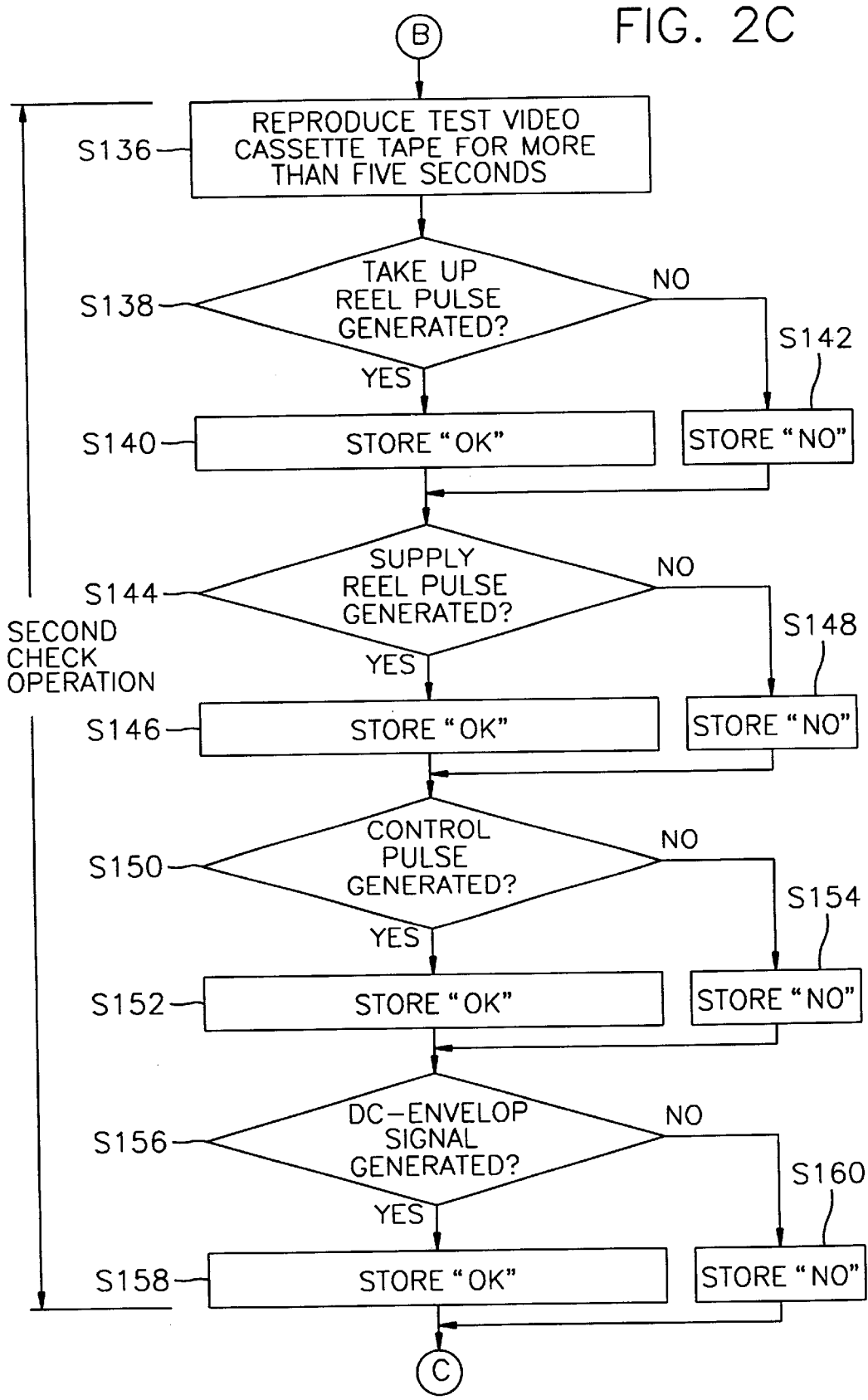

As shown in FIG. 2C, if control section 70 detects the test tape in step 134, control section 70 reproduces the test video cassette tape for more than 5 seconds (step S136). Control section 70 sequentially checks the takeup reel pulse, the supply reel pulse, the control pulse and the DC-envelop signal generated by the reproducing operation thereof.

That is, control section 70 checks whether the takeup reel pulse is generated (step S138) and if so, it determines that there is no error in the takeup reel system and stores "OK" at a takeup reel check list in memory 72 (step S140). On the other hand, if there is no pulse generation, control section 70 determines that there is an error in the takeup reel system and stores "NO" in memory 72 (step S142). Thereafter, control section 70 checks whether the supply reel pulse is generated (step S144) and if so, it determines that there is no error in the supply reel system and stores "OK" at a supply reel check list in memory 72 (step S146). On the other hand, if there is no pulse generation, control section 70 determines that there is an error in the supply reel system and stores "NO" in memory 72 (step S148).

Also, control section 70 checks whether the control pulse generated by a control head is generated (step S150) and if so, it determines that there is no error in the control head system and stores "OK" at a control head check list in memory 72 (step S152). On the other hand, if there is no pulse generation, control section 70 determines that there is an error in the control head system and stores "NO" in memory 72 (step S154). Thereafter, control section 70 checks whether the DC-envelop signal is generated (step S156) and if so, it determines that there is no error in a video reproducing head system and stores "OK" at a takeup reel check list in memory 72 (step S158). On the other hand, if there is no pulse generation, control section 70 determines that there is an error in the video reproducing head system and stores "NO" in memory 72 (step S160).

As described above, in the second check operation, the reel and reproducing head systems are checked according to the reproducing operation thereof.

As shown in FIG. 2D, in the third check operation, control section 70 sequentially carries out CUE, REV, STILL, SLOW, STOP, REW, FF and EJECT modes for a predetermined time at each mode (step S162). While sequentially carrying out the above stated modes, control section 70 inputs a switching signal of a program switch which is switched in response to a cam operation of deck section 50 as a cam data. Control section 70 checks whether the inputted cam data is identical to a predetermined reference data of each operational mode (step S164). If so, it determines that there is no error in a driving mechanism and stores "OK" at a cam data check list in memory 72 (step S166). On the other hand, if there is no pulse generation, control section 70 determines that there is an error in the driving mechanism and stores "NO" in memory 72 (step S168).

Figure 7:
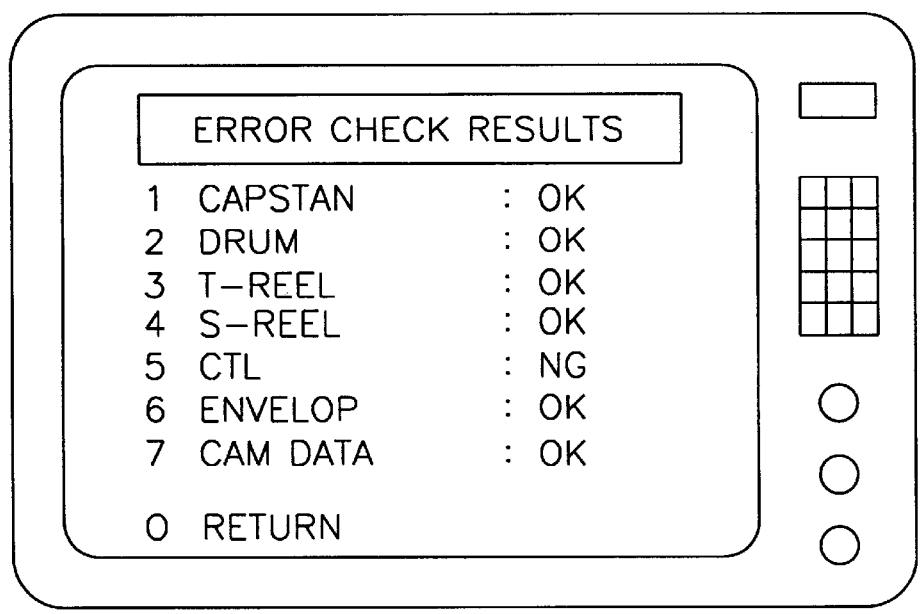

As described above, when the third check operation is finished, control section 70 fetches the check results according to each check list stored in the memory and displays an error check result picture on the screen as shown in FIG. 7 (step S170). Accordingly, the worker can easily detect where in deck section 50 is to be repaired by checking the displayed picture. In the picture in FIG. 7, when the worker pushes the number key "0" (step S172), control section 70 returns the picture to the repair mode menu picture as shown in FIG. 4.

As above described, by the method and apparatus for interactively checking an error of a video cassette tape recorder according to the present invention, the worker can easily check errors of the video cassette tape recorder just with the television set, the remote controller and the test video cassette recorder without any special test instrument or tool. Also, the worker can interactively carry out the check operation following the sequential instructions displayed on the pictures. In addition, the check results are displayed in detail on the screen so that anyone who is not skilled in the art can systematically carry out the operations thereof.

Therefore, at a research laboratory, a test process in the manufacturing line or a service place, even an unskilled worker can easily check errors of the set only with the television set, the remote controller and the test tape.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A method for interactively checking an error of a video cassette tape recorder, said method comprising the steps of:
   (i) checking whether a service mode is selected by a first remote controller input;
   (ii) displaying a menu picture on a television screen if the service mode is selected;
   (iii) checking whether an error check mode in the menu picture is selected by a second remote controller input;
   (iv) displaying an error check mode picture on the television screen if the error check mode is selected, carrying out a first check operation about a reproducing system and storing a first check result into a memory;
   (v) displaying an insertion request picture which requests an insertion of a test video cassette on the television screen when the first check operation is finished;
   (vi) carrying out a second check operation about the reproducing system while a reproduction operation is going on after the test video cassette is inserted and storing a second check result into the memory;
   (vii) carrying out each operation mode sequentially after the second check operation is finished, carrying out a third check operation about the reproducing system and storing a third result into the memory; and
   (viii) displaying the first, second and third check results stored in the memory on the television screen after the third check operation is finished.

2. The method for interactively checking an error of a video cassette tape recorder recited in claim 1, wherein the service mode is selected by at least three remote controller inputs which are known only to a maker or to service workers.

3. The method for interactively checking an error of a video cassette tape recorder recited in claim 2, wherein the three remote controller inputs are sequential inputs consisting of a menu key, a number key "4", a number key "8" and the number key "4".

4. The method for interactively checking an error of a video cassette tape recorder recited in claim 1, wherein the error check mode is selected by a number key input corresponding to the error check mode displayed on the menu picture.

5. The method for interactively checking an error of a video cassette tape recorder recited in claim 1, wherein in the first check operation, whether a frequency generating signal of each motor is generated or not is checked while actuating a capstan motor and a drum motor for a predetermined time.

6. The method for interactively checking an error of a video cassette tape recorder recited in claim 1, wherein the step (v) comprises:

checking whether a video cassette is loaded;

ejecting the video cassette if the video cassette is loaded; and displaying the insertion request picture which requests the insertion of the test video cassette on the television screen when there is no loaded video cassette or when the video cassette has been ejected.

7. The method for interactively checking an error of a video cassette tape recorder recited in claim 1, wherein in the step (vi), whether or not a takeup reel pulse, a supply reel pulse, a reproduced control pulse and a reproduced DC envelop signal is checked.

8. The method for interactively checking an error of a video cassette tape recorder recited in claim 1, wherein in the step (vii), a cam data generated by sequentially carrying out a CUE, a REV, a STILL, a STOP, a REW, a FF and an EJECT, each of which being carried out for predetermined time, respectively, is checked.

9. The method for interactively checking an error of a video cassette tape recorder recited in claim 1, wherein after the steps (iv), (vi) and (vii) are finished, each of a capstan motor frequency pulse, a drum motor frequency pulse, the takeup reel pulse, the supply reel pulse, a control pulse, a DC-envelop signal, the cam data is identified as "OK" or "NO" according to each error thereof.

10. A video cassette tape recorder capable of interactively checking an error, which comprises:

an input means for inputting a remote control signal;

on-screen-display signal generating means for outputting an on-screen-display picture signal onto a television screen by inputting an on-screen-display data;

a deck section for generating a capstan motor frequency pulse, a drum motor frequency pulse, a takeup reel pulse, a supply reel pulse and a cam data;

a video processing section for generating a control pulse and a DC envelop signal reproduced from a test video tape; and a control section for checking whether a service mode is selected by a remote control signal by the input means, displaying a menu picture on the television screen by the on-screen-display signal generating means if the service mode is selected, checking whether an error check mode in the menu picture is selected, displaying an error check mode picture on the television screen if the error check mode is selected, carrying out a first check operation about the deck section, storing a first check result into a memory, displaying an insertion request picture which requests an insertion of a test video cassette on the television screen, carrying out a second check operation about the deck section and the video processing section while a reproduction operation is going on after the test video cassette is inserted, storing a second check result into the memory, carrying out each operation mode sequentially, carrying out a third check operation about the deck section, storing a third result into the memory; and displaying the first, second and third check results stored in the memory on the television screen.

11. The video cassette tape recorder capable of interactively checking an error recited in claim 10, wherein the service mode is selected by at least three remote control inputs which are known only to a maker or to service workers.

12. The video cassette tape recorder capable of interactively checking an error recited in claim 10, wherein in the first check operation whether or not a frequency generating signal of each motor is generated by actuating a capstan motor and a drum motor for a predetermined time is checked.

13. The video cassette tape recorder capable of interactively checking an error recited in claim 10, wherein the control section checks whether a video cassette is loaded, ejects the video cassette if the video cassette has been loaded and displays the insertion request picture which requests the insertion of the test video cassette on the television screen when there is no loaded video cassette or when the video cassette has been ejected.

14. The video cassette tape recorder capable of interactively checking an error recited in claim 10, wherein the second check operation checks whether or not takeup reel pulse, supply reel pulse, reproduced control pulse and reproduced DC-envelop signals are generated.

15. The video cassette tape recorder capable of interactively checking an error recited in claim 10, wherein the third check operation checks a cam data generated by sequentially carrying out CUE, REV, STILL, STOP, REW, FF and EJECT modes, each of which is carried out for a predetermined time, respectively.

16. The video cassette tape recorder capable of interactively checking an error recited in claim 10, wherein after the first, second and third check operations are finished, each of a capstan motor frequency pulse, a drum motor frequency pulse, a takeup reel pulse, a supply reel pulse, a reproduced control pulse, a reproduced DC-envelop signal, a cam data is displayed on the television screen as "OK" or "NO" according to each error thereof.

17. A method for interactively checking an error of a video cassette tape recorder, which comprises the steps of:

(i) displaying a menu picture on a television screen if a service mode is selected;

(ii) displaying an error check mode picture on the television screen if the error check mode is selected, carrying out a first check operation about a reproducing system and storing a first check result into a memory;

(iii) checking whether a video cassette is loaded when the first check operation is finished;

(iv) ejecting the video cassette if the video cassette has been loaded;

(v) displaying the insertion request picture which requests the insertion of the test video cassette on the television screen when there is no loaded video cassette or when the video cassette has been ejected;

(vi) carrying out a second check operation about the reproducing system while a reproduction operation is going on after the test video cassette is inserted and storing a second check result into the memory;

(vii) carrying out each operation mode sequentially after the second check operation is finished, carrying out a third check operation about the reproducing system and storing a third result into the memory; and (viii) displaying the first, second and third check results stored in the memory on the television screen after the third check operation is finished.

* * * * *